US012774963B2

(12) United States Patent
Sugimoto

(10) Patent No.: US 12,774,963 B2
(45) Date of Patent: Oct. 27, 2026

(54) INSPECTION ASSISTANCE SYSTEM, INSPECTION ASSISTANCE METHOD, AND PROGRAM

(71) Applicant: SUMITOMO HEAVY INDUSTRIES, LTD., Tokyo (JP)

(72) Inventor: Shintaroh Sugimoto, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 127 days.

(21) Appl. No.: 18/939,426

(22) Filed: Nov. 6, 2024

(65) Prior Publication Data

US 2025/0146950 A1 May 8, 2025

(30) Foreign Application Priority Data

Nov. 8, 2023 (JP) ................................ 2023-190698

(51) Int. Cl.

| | |
|---|---|
| ***G01N 21/95*** | (2006.01) |
| ***G01N 21/17*** | (2006.01) |
| ***G01N 21/88*** | (2006.01) |
| ***G01N 21/958*** | (2006.01) |

(52) U.S. Cl.

CPC ......... *G01N 21/8851* (2013.01); *G01N 21/17* (2013.01); *G01N 21/8806* (2013.01); *G01N 21/9515* (2013.01); *G01N 21/958* (2013.01); *G01N 2021/177* (2013.01); *G01N 2021/8848* (2013.01)

(58) Field of Classification Search

CPC ............... G01N 21/8851; G01N 21/17; G01N 21/8806; G01N 21/9515; G01N 21/958; G01N 2021/177; G01N 2021/8848

See application file for complete search history.

(56) References Cited

U.S. PATENT DOCUMENTS

| | | | | |
|---|---|---|---|---|
| 2002/0038920 | A1* | 4/2002 | Tsuchiya | B29C 45/0053 264/328.7 |
| 2011/0221885 | A1* | 9/2011 | Suzuki | G01N 21/21 348/125 |
| 2013/0123985 | A1* | 5/2013 | Hirai | B25J 9/1697 348/94 |
| 2018/0302605 | A1* | 10/2018 | Wolke | G01B 11/24 |
| 2021/0056681 | A1* | 2/2021 | Hyatt | G05B 19/41875 |
| 2021/0299879 | A1* | 9/2021 | Pinter | B25J 9/1697 |
| 2021/0372778 | A1* | 12/2021 | Imai | H04N 23/56 |
| 2024/0385123 | A1* | 11/2024 | Colle | G01M 5/0091 |
| 2024/0404035 | A1* | 12/2024 | Druetto | G01N 21/90 |

FOREIGN PATENT DOCUMENTS

| | | |
|---|---|---|
| JP | 2018-136269 A | 8/2018 |

* cited by examiner

*Primary Examiner* — Jonathan M Hansen

(74) *Attorney, Agent, or Firm* — WTA IP Law P.C.

(57) ABSTRACT

An inspection assistance system includes a first irradiator that irradiates a transparent or translucent injection molding product with light from a lower side, a second irradiator that irradiates the injection molding product with light from an upper side, and an imaging unit that performs first imaging for imaging the injection molding product in a state where the injection molding product is irradiated with the light from the first irradiator, and second imaging for imaging the injection molding product in a state where the injection molding product is irradiated with the light from the second irradiator, by using a polarization camera.

11 Claims, 9 Drawing Sheets

FIG. 6A $$\mathrm{AoLP} = \frac{1}{2}\arctan\frac{U}{Q}$$

FIG. 6B $$\mathrm{DoLP} = \frac{\sqrt{Q^2 + U^2}}{I}$$

100

100

INSPECTION ASSISTANCE SYSTEM, INSPECTION ASSISTANCE METHOD, AND PROGRAM

CROSS-REFERENCE TO RELATED APPLICATIONS

This application claims priority to Japanese Patent Application No. 2023-190698, filed on Nov. 8, 2023, which is incorporated by reference herein in its entirety.

BACKGROUND

Technical Field

Certain embodiments of the present invention relate to an inspection assistance system, an inspection assistance method, and a program.

Description of Related Art

There is known a technique for highlighting and displaying defects in an injection molding product (for example, the related art). In such a technique, defects in an injection molding product are highlighted in a captured image of the injection molding product captured by using a monochrome camera or a color camera.

SUMMARY

According to an embodiment of the present invention, there is provided an inspection assistance system including: a first irradiator that irradiates a transparent or translucent injection molding product with light from a lower side; a second irradiator that irradiates the injection molding product with light from an upper side; and an imaging unit that performs first imaging for imaging the injection molding product in a state where the injection molding product is irradiated with the light from the first irradiator and second imaging for imaging the injection molding product in a state where the injection molding product is irradiated with the light from the second irradiator, by using a polarization camera.

According to an embodiment of the present invention, there is provided an inspection assistance method including: a step of irradiating a transparent or translucent injection molding product with light from a lower side; a step of irradiating the injection molding product with light from an upper side; a step of performing first imaging for imaging the injection molding product in a state where the injection molding product is irradiated with the light from the lower side and second imaging for imaging the injection molding product in a state where the injection molding product is irradiated with the light from the upper side, by using a polarization camera; a step of acquiring a first captured image obtained by the first imaging and a second captured image obtained by the second imaging; and a step of analyzing at least one of the first captured image and the second captured image to present to a user presence or absence of a defect in the injection molding product.

According to an embodiment of the present invention, there is provided a non-transitory computer readable medium storing a program, the program when executed by a computer, causing the computer to: irradiate a transparent or translucent injection molding product with light from a lower side; irradiate the injection molding product with light from an upper side; perform first imaging for imaging the injection molding product in a state where the injection molding product is irradiated with the light from the lower side and second imaging for imaging the injection molding product in a state where the injection molding product is irradiated with the light from the upper side, by using a polarization camera; acquire a first captured image obtained by the first imaging and a second captured image obtained by the second imaging; and analyze at least one of the first captured image and the second captured image to present to a user presence or absence of a defect in the injection molding product.

BRIEF DESCRIPTION OF THE DRAWINGS

FIG. 5A is a diagram showing a specific example of a 1ch image as a determination image. FIG. 5B is a diagram showing a specific example of a 3ch image as a determination image.

FIG. 6A is an expression showing an angle of linear polarization of the 3ch image.

FIG. 6B is an expression showing a degree of linear polarization of the 3ch image.

DETAILED DESCRIPTION

It has been difficult to accurately detect all types of defects generated in a transparent or translucent injection molding product in the captured image of the transparent or translucent injection molding product captured by a monochrome camera or a color camera.

It is desirable to accurately detect all types of defects generated in a transparent or translucent injection molding product.

Here, a light shielding switching unit that transmits the light from the lower side when the first imaging is performed and that shields the light from the lower side when the second imaging is performed may be further provided.

The inspection assistance system may further include a support member including a light transmission portion that transmits the light from the lower side and a light shielding portion that shields the light from the lower side, and on which the injection molding product is placed on the upper side, in which the light shielding switching unit may place the injection molding product on the light transmission portion of the support member when the first imaging is performed, and may place the injection molding product on the light shielding portion of the support member when the second imaging is performed.

In addition, a picking robot or an extruder may be used as the light shielding switching unit to move the injection molding product between the light transmission portion and the light shielding portion.

In addition, the second irradiator may be mounted on an end effector of the picking robot.

In addition, an acquisition unit that acquires a first captured image obtained by the first imaging and a second captured image obtained by the second imaging, and a presentation unit that analyzes at least one of the acquired first captured image and second captured image and that presents to a user presence or absence of a defect in the injection molding product may be further provided.

In addition, the presentation unit may analyze the first captured image and present to the user presence or absence of a defect derived from a resin flow in the injection molding product.

In addition, the presentation unit may analyze the second captured image and present to the user presence or absence of a defect other than a defect derived from a resin flow in the injection molding product.

Hereinafter, an embodiment of the present invention will be described in detail with reference to the accompanying drawings.

ONE EMBODIMENT

Configuration of Inspection Assistance System 1

Figure 1:
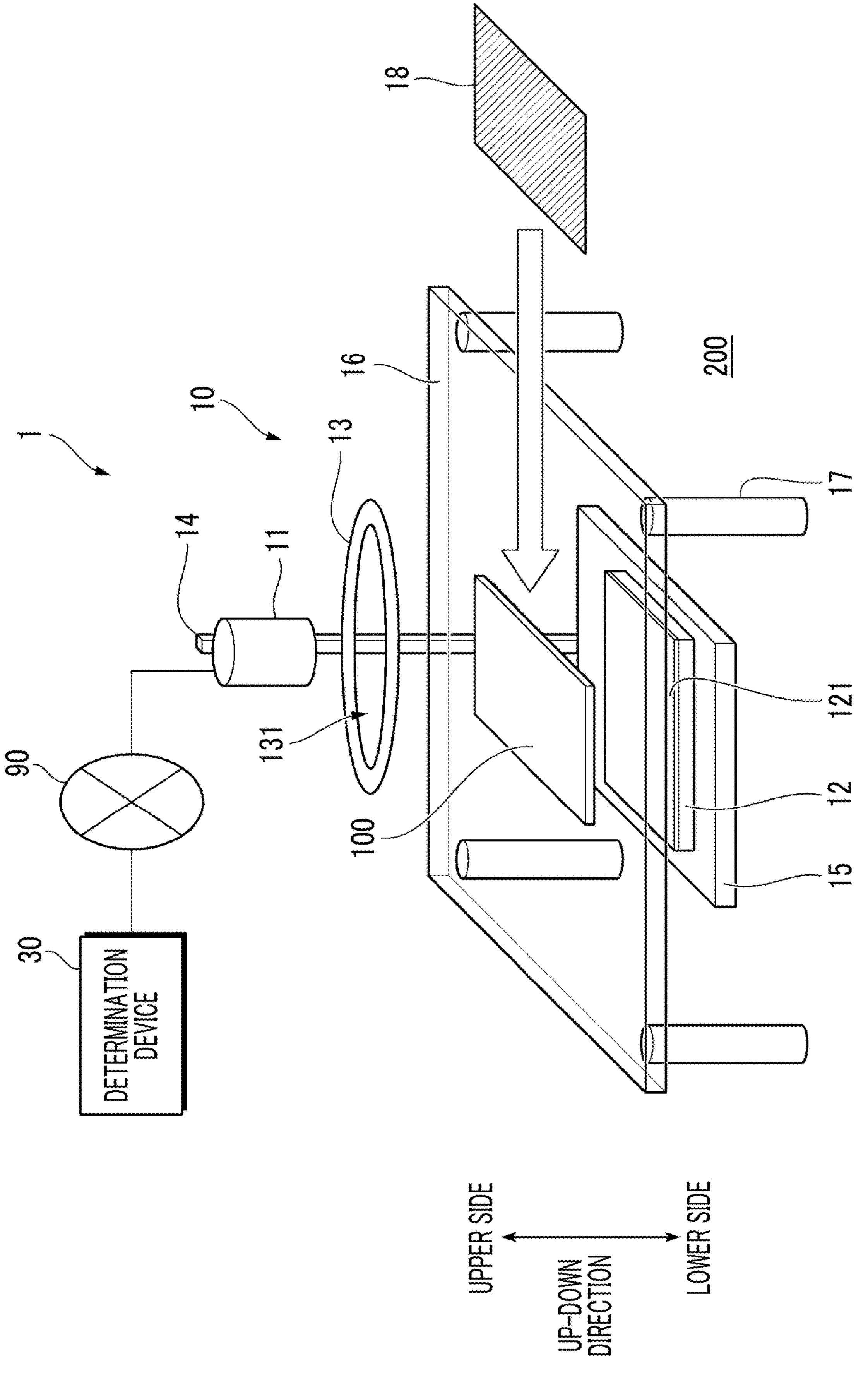
FIG. 1 is a diagram showing an example of an overall configuration of an inspection assistance system according to one embodiment.

FIG. 1 is a diagram showing an example of an overall configuration of an inspection assistance system 1 according to one embodiment.

The inspection assistance system 1 shown in FIG. 1 is used for quality inspection of a transparent or translucent injection molding product 100. The injection molding product 100 is manufactured by an injection molding machine (not shown), and the shape thereof is not particularly limited. In the present embodiment, a transparent or translucent flat plate-shaped injection molding product is a target of a quality inspection. The injection molding machine can manufacture an injection molding product by pouring a resin melted by heating into a mold, solidifying the resin by cooling, and then extracting the resin. The inspection assistance system 1 includes an imaging device 10 and a determination device 30 connected to each other via a network 90. The network 90 is, for example, a local area network (LAN), the Internet, a wired connection, or the like.

Imaging Device 10

The imaging device 10 includes an imaging unit 11, a first irradiator 12, a second irradiator 13, a first fixing member 14, a second fixing member 15, a support member 16, and a third fixing member 17.

The imaging unit 11 is composed of a camera or the like, and images the injection molding product 100 as a subject. Specifically, the imaging unit 11 performs first imaging for imaging the injection molding product 100 that has received light irradiated from a lower side toward an upper side in an up-down direction of FIG. 1 and second imaging for imaging the injection molding product 100 that has received light irradiated from the upper side toward the lower side. The imaging device 10 switches between the first imaging and the second imaging. That is, the imaging device 10 does not perform the second imaging when the first imaging is performed, and does not perform the first imaging when the second imaging is performed. Hereinafter, a captured image acquired by the first imaging is referred to as a "first captured image", and a captured image acquired by the second imaging is referred to as a "second captured image". In addition, when there is no need to particularly distinguish between the first captured image and the second captured image, the captured image is simply referred to as a "captured image".

The imaging unit 11 transmits the captured first captured image and second captured image to the determination device 30. The imaging unit 11 uses a polarization camera to perform the first imaging and the second imaging. A polarization camera is a camera in which polarizers of different directions are incorporated on a charge-coupled device (CCD) or a complementary metal-oxide-semiconductor (CMOS).

The directions of the polarizers incorporated in the polarization camera are four directions of 0°, 45°, 90°, and 135°, and each time the first imaging is performed once, the polarization image in each of the four directions is acquired as the first captured image. In addition, each time the second imaging is performed once, a polarization image in each of the four directions is acquired as the second captured image. Specific examples of the polarization images in the four directions will be described later with reference to FIGS. 4A to 4D.

The first irradiator 12 is a flat plate-shaped lighting fixture including a polarization plate 121. The light irradiated from the first irradiator 12 includes the light for irradiating the injection molding product 100 from the lower side, and the first imaging of the imaging unit 11 is assisted by the irradiation light. The first irradiator 12 is disposed on the lower side with respect to the injection molding product 100. The polarization plate 121 is a member for creating a polarization state of the irradiation light, and determines an initial state of the irradiation light by shielding one of the light waves of the irradiation light in two directions (vertical and horizontal directions). That is, since the polarization state of the irradiation light is broken by residual stress, the polarization camera of the imaging unit 11 captures a change in the state.

The second irradiator 13 is a ring-shaped lighting fixture including an opening portion 131. The light irradiated from the second irradiator 13 includes the light irradiating the injection molding product 100 from the upper side, and the second imaging of the imaging unit 11 is assisted by the irradiation light. The second irradiator 13 is disposed on the upper side of the injection molding product 100 and on the lower side of the imaging unit 11. The opening portion 131 forms an imaging space for preventing the second irradiator 13 from being reflected as much as possible during the imaging of the injection molding product 100. That is, the imaging by the imaging unit 11 is performed toward the lower side via the opening portion 131 of the second irradiator 13.

The first fixing member 14 is a member for fixing the imaging unit 11 and the second irradiator 13, and is composed of a rod-shaped member extending in the up-down direction, or the like. The first fixing member 14 is fixed to the second fixing member 15 (to be described later).

The second fixing member 15 is a member for fixing the first irradiator 12 and the first fixing member 14, and is composed of a flat plate-shaped member or the like. The second fixing member 15 is fixed to an installation surface 200. The imaging unit 11 and the second irradiator 13 are fixed to the first fixing member 14, and the first fixing member 14 is fixed to the second fixing member 15, thereby positioning the imaging unit 11, the second irradiator 13, and the first irradiator 12.

The support member 16 is a rectangular plate material on which the injection molding product 100 can be placed, and supports the injection molding product 100 from the lower side. The support member 16 is made of, for example, a transparent or substantially transparent plate material having non-polarizing characteristics, such as quartz glass. The support member 16 transmits the light irradiated from the first irradiator 12 toward the injection molding product 100. The support member 16 is fixed to the installation surface 200 in a state of being supported by four third fixing members 17 formed of a columnar member or the like.

Further, when the second imaging is performed by the imaging unit 11, a light shielding member 18 serving as the light shielding switching unit is disposed between the injection molding product 100 and the support member 16. A method of disposing the light shielding member 18 is not particularly limited, and, for example, a picking robot (not shown) may perform the method, or a user may perform the method manually. The light shielding member 18 is made of a member having a light shielding function such as vinyl chloride or a flocked paper, and assists the second imaging by the imaging unit 11 by shielding light from the lower side.

Determination Device 30

The determination device 30 is an information processing device that analyzes the first captured image and the second captured image, determines whether or not there is a defect in the injection molding product 100, and presents the determination to a user. The determination device 30 is composed of a personal computer, a tablet terminal, a smartphone, or the like, and allows a user to operate the determination device 30.

Hardware Configuration of Determination Device 30

Figure 2:
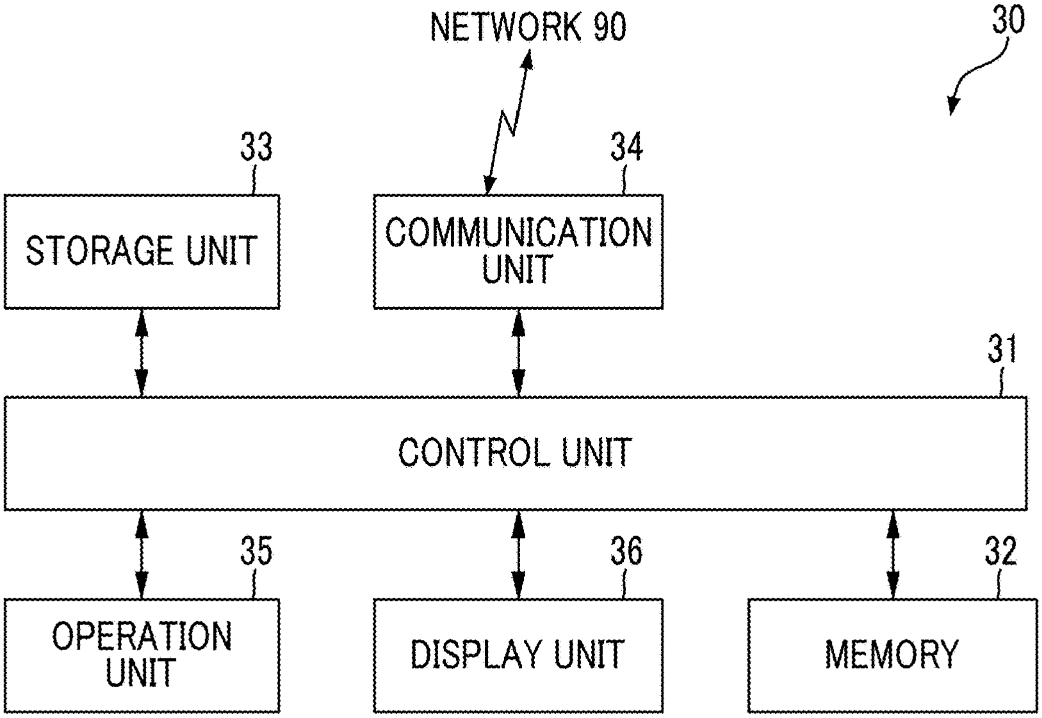
FIG. 2 is a diagram showing an example of a hardware configuration of a determination device.

FIG. 2 is a diagram showing an example of a hardware configuration of the determination device 30.

The determination device 30 includes a control unit 31, a memory 32, a storage unit 33, a communication unit 34, an operation unit 35, and a display unit 36. Each of these units is connected by a data bus, an address bus, a Peripheral Component Interconnect (PCI) bus, or the like.

The control unit 31 is a processor that performs control of the functions of the determination device 30 through the execution of various software such as an OS (basic software) and application software. The control unit 31 is composed of, for example, a central processing unit (CPU). The memory 32 is a storage region that stores various software, data used for execution of the software, and the like, and is used as a work area during calculation. The memory 32 is composed of, for example, a random-access memory (RAM) or the like.

The storage unit 33 is a storage region that stores input data for various software, output data from various software, and the like. The storage unit 33 is composed of, for example, a hard disk drive (HDD), a solid-state drive (SSD), a semiconductor memory, or the like used for storing a program, various types of setting data, or the like. The storage unit 33 stores a database that stores various types of information. Examples of the database stored in the storage unit 33 include a database in which the captured image of the first imaging is stored, a database in which the captured image of the second imaging is stored, a database in which training data used for determining presence or absence of a defect is stored, and a database in which a trained model is stored.

The communication unit 34 transmits and receives data between the determination device 30 and the outside via the network 90. The operation unit 35 is composed of, for example, a software keyboard, a mechanical button, a switch, or the like, and receives an input operation. The operation unit 35 also includes a touch sensor that is integrated with the display unit 36 to form a touch panel. The display unit 36 is composed of, for example, a liquid-crystal display or an organic electro luminescence (EL) display used for displaying information, and displays data such as an image or text including a determination result of the presence or absence of a defect by the determination device 30.

Functional Configuration of Control Unit 31 of Determination Device 30

Figure 3:
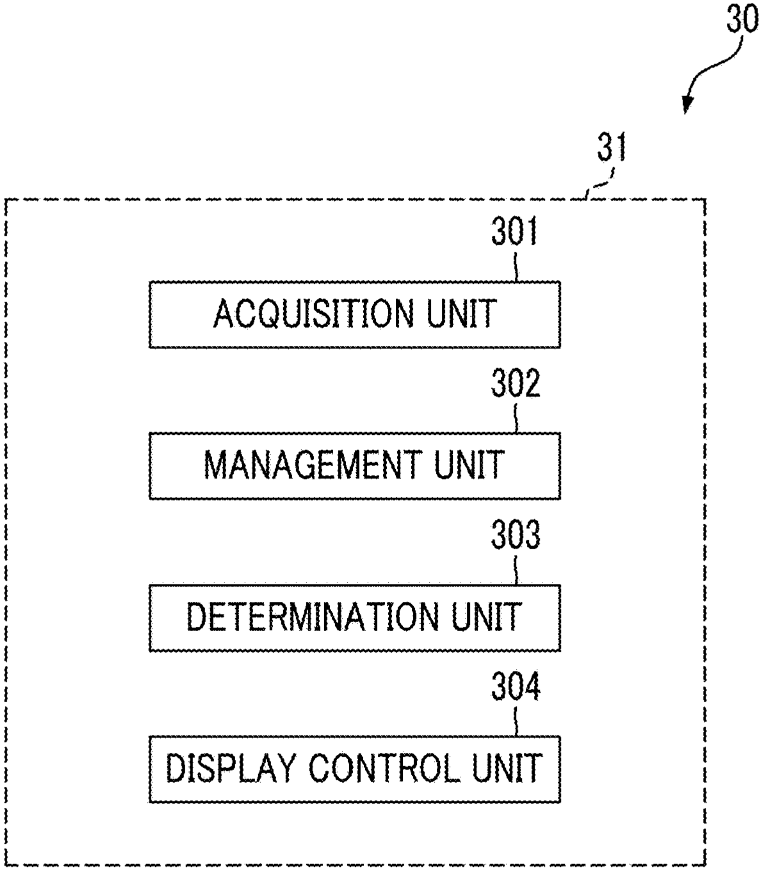
FIG. 3 is a diagram showing an example of a functional configuration of a control unit of the determination device.
Figure 4A:
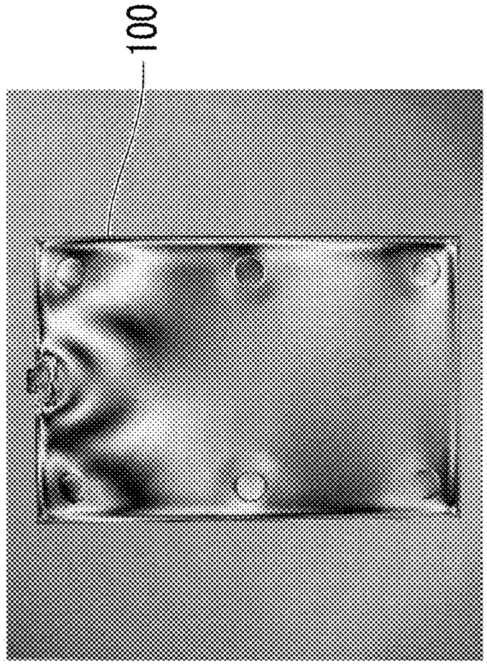
FIGS. 4A to 4D are diagrams showing specific examples of a second captured image of an injection molding product, acquired as a result of an imaging device performing second imaging.
Figure 4B:
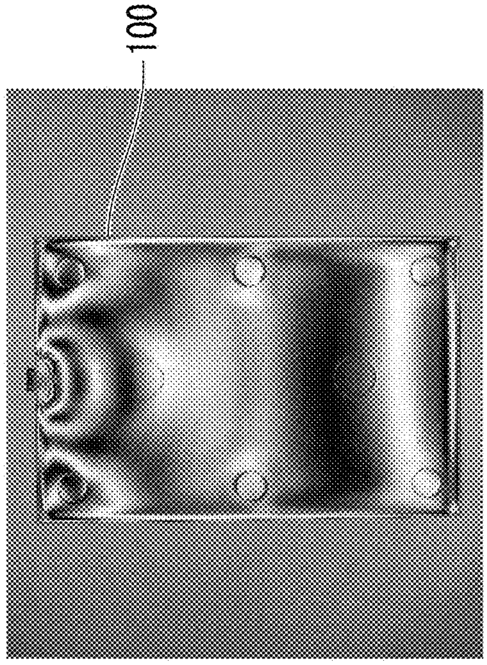
Figure 4C:
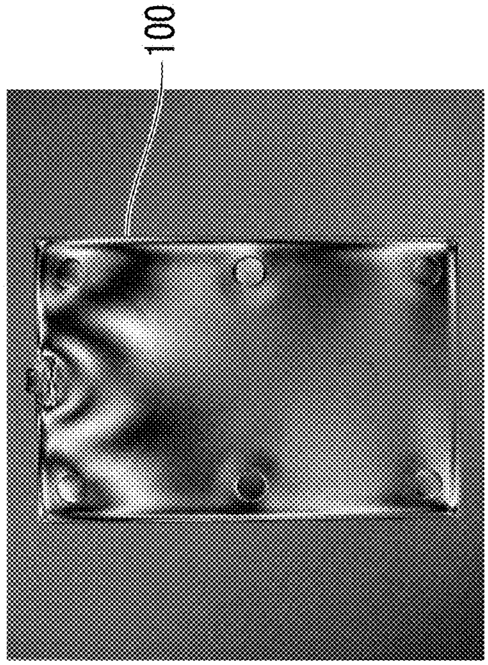
Figure 4D:
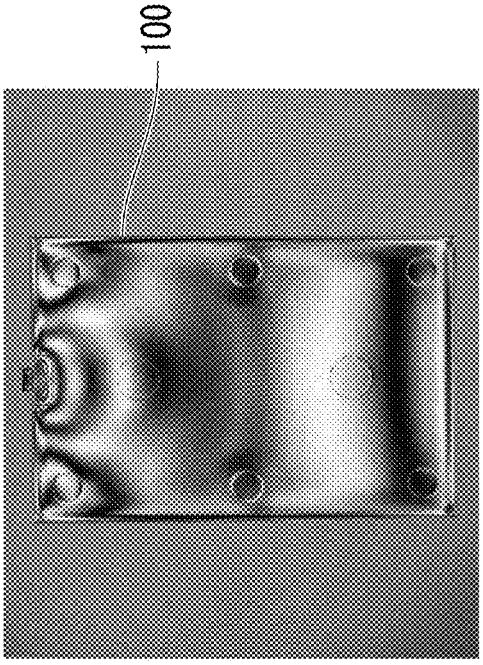

FIG. 3 is a diagram showing an example of a functional configuration of the control unit 31 of the determination device 30.

In the control unit 31 of the determination device 30, an acquisition unit 301, a management unit 302, a determination unit 303, and a display control unit 304 function.

The acquisition unit 301 acquires various types of information via the communication unit 34 (see FIG. 2). For example, the acquisition unit 301 acquires the first captured image and the second captured image transmitted from the imaging device 10.

The management unit 302 stores and manages various types of information acquired by the acquisition unit 301 in the database of the storage unit 33 (see FIG. 2). For example, the management unit 302 stores and manages each of the first captured image and the second captured image acquired by the acquisition unit 301 in the database. In addition, the management unit 302 stores and manages the training data used for determining the presence or absence of a defect in the database in advance.

The determination unit 303 analyzes the first captured image to determine the presence or absence of a defect in the injection molding product 100 (see FIG. 1). In addition, the determination unit 303 analyzes the second captured image to determine the presence or absence of a defect in the injection molding product 100. Specifically, the determination unit 303 analyzes the first captured image of the injection molding product 100 to determine the presence or absence of a general defect other than the defect derived from a resin flow. In addition, in this case, the determination unit 303 analyzes the second captured image of the injection molding product 100 to determine the presence or absence of each of the defect derived from the resin flow and the general defect in the injection molding product.

Here, the "defect derived from the resin flow" is, for example, a defect such as a distortion or a concave portion formed on a surface of a molding product at the time of shrinkage when a molten resin is cooled and solidified (also referred to as a "sink mark"). In addition, the "general defect" is, for example, a defect in which a bubble is generated inside a molding product (also referred to as a "void"), a defect in which gas generated inside a molten resin flows in a stretched manner together with the molten resin inside the mold, forming gas flow marks on the surface of the molding product (also referred to as a "silver streak"), and a defect caused by insufficient filling caused by molding when some parts of the mold are not filled with molten resin (also referred to as a "short shot").

The determination unit 303 generates a determination image from the polarization images in the four directions which are the second captured images acquired by the acquisition unit 301, and determines whether or not the injection molding product 100 has a defect, by using the generated determination image. Examples of the determination image generated by the determination unit 303 include a 1ch image, which is a monochrome image generated by averaging the polarization images in the four directions, and a 3ch image, which is a color image. The 1ch image and the 3ch image as the determination images will be described later with reference to FIGS. 5A and 5B and subsequent figures.

The display control unit 304 performs control to display various types of information on the display unit 36 (see FIG. 2). For example, the display control unit 304 performs control to display the determination result of the presence or absence of the defect of the injection molding product 100 by the determination unit 303 on the display unit 36. A specific example of the determination result displayed on the display unit 36 will be described later with reference to FIG. 8.

SPECIFIC EXAMPLES

FIGS. 4A to 4D are diagrams showing specific examples of the second captured image of the injection molding product 100, acquired as a result of the imaging device 10 performing second imaging.

As described above, when the imaging device 10 performs the second imaging, the polarization images in the four directions are acquired as the second captured image. FIGS. 4A to 4D show a specific example of the polarization images in "0°", "45°", "90°", and "135°" with the injection molding product 100 as a subject, as a specific example of the polarization images in the four directions.

Figure 5B:
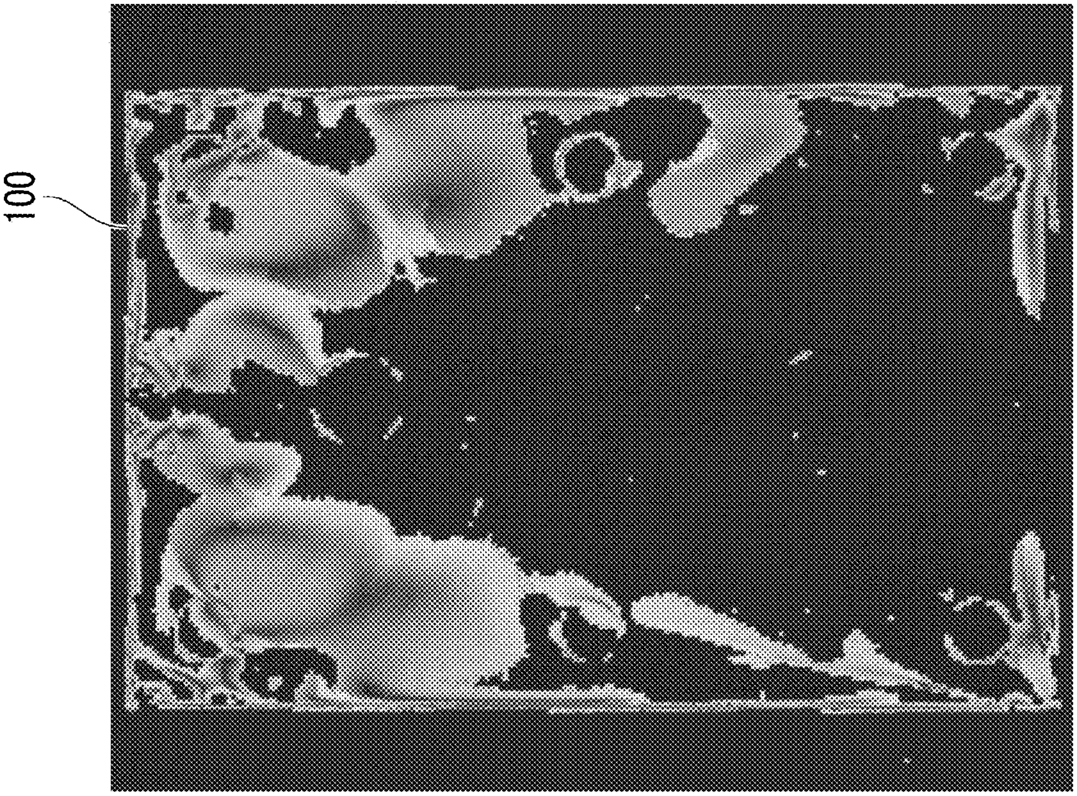
FIGS. 5A and 5B are diagrams showing a specific example of a determination image generated by the determination device.
Figure 5A:
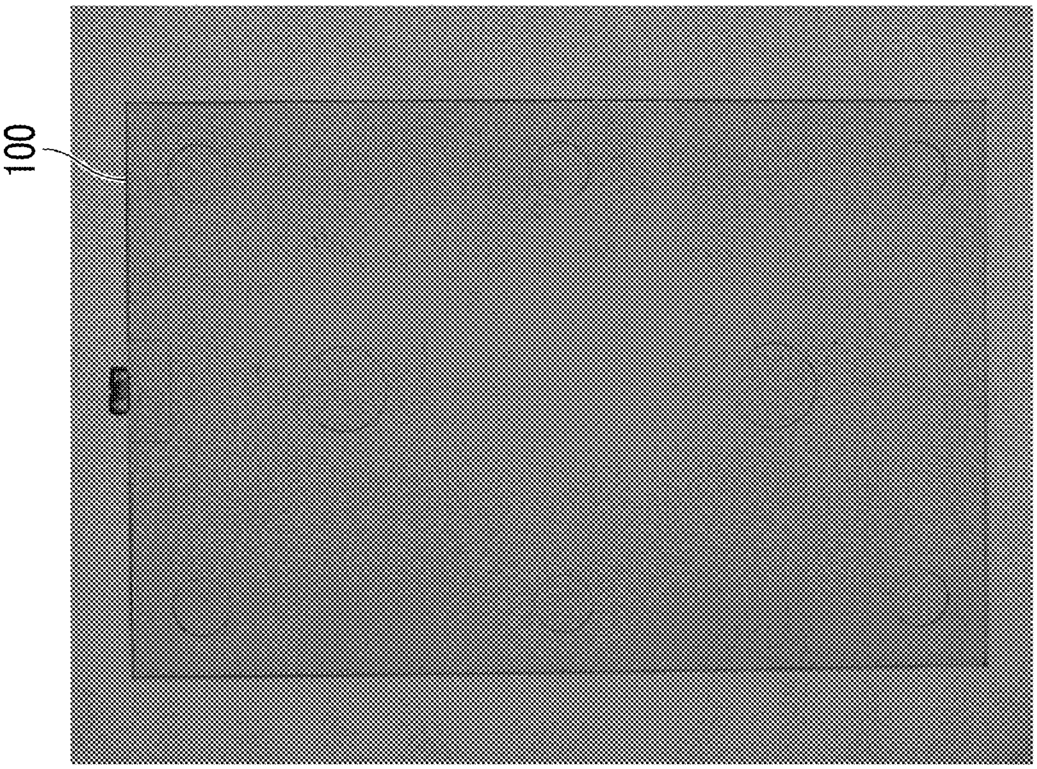

FIGS. 5A and 5B are diagrams showing a specific example of a determination image generated by the determination device 30. FIG. 5A is a diagram showing a specific example of the 1ch image as the determination image. FIG. 5B is a diagram showing a specific example of the 3ch image as the determination image.

FIG. 6A is an expression showing an angle of linear polarization of the 3ch image. FIG. 6B is an expression showing a degree of linear polarization of the 3ch image.

Among the determination images generated by the determination device 30, the 1ch image illustrated in FIG. 5A is a determination image mainly representing the strength of the injection molding product 100. In addition, among the determination images, the 3ch image illustrated in FIG. 5B is a determination image mainly representing the strength of the injection molding product 100, an angle of linear polarization (AoLP), and a degree of linear polarization (DoLP).

The angle of linear polarization (AoLP) in the 3ch image is a value calculated by the expression in FIG. 6A, and indicates in which direction of the four directions the light is polarized. In addition, the degree of linear polarization (DoLP) is a value calculated by the expression in FIG. 6B, and indicates how close the linear polarization is. In the expressions in each of FIGS. 6A and 6B, "I" indicates light intensity. In addition, "Q" indicates the light intensity obtained by subtracting "the light intensity when the direction of the polarizer is 90°" from "the light intensity when the direction of the polarizer is 0°", and "U" indicates the light intensity obtained by subtracting "the light intensity when the direction of the polarizer is 135°" from "the light intensity when the direction of the polarizer is 45°".

Figure 7B:
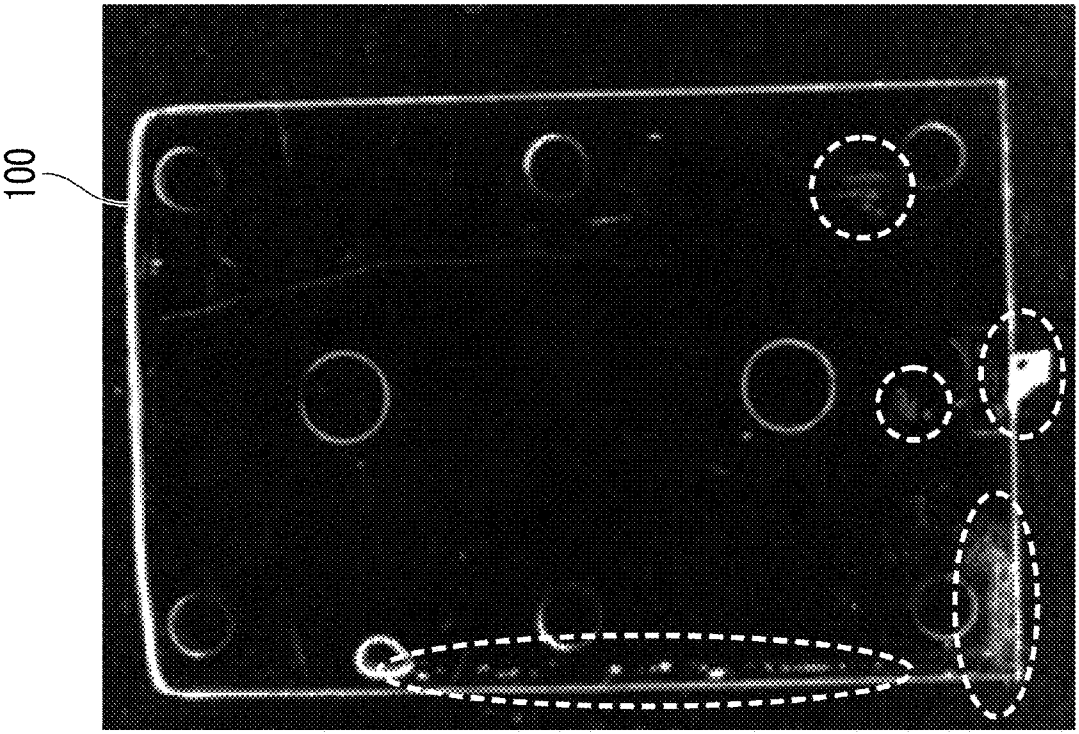
FIGS. 7A and 7B are diagrams showing specific examples of a 1ch image of an injection molding product determined to have a defect by the determination device.
Figure 7A:
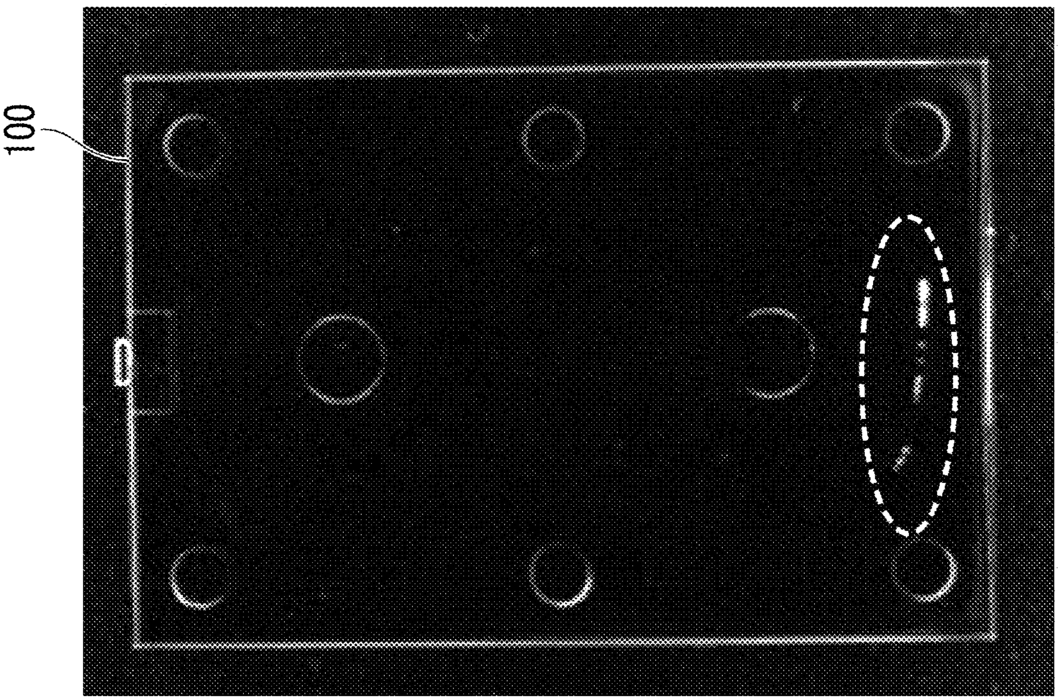

FIGS. 7A and 7B are diagrams showing specific examples of a 1ch image of an injection molding product 100 determined to have a defect by the determination device 30.

FIGS. 7A and 7B respectively show specific examples of 1ch images of the injection molding product 100 determined to have a general defect. The 1ch images shown in FIGS. 7A and 7B are specific examples of the determination image generated based on the second captured image. Among these, the 1ch image of FIG. 7A shows that a void, which is a general defect, is generated in a region surrounded by a broken line, as a determination result. In addition, the 1ch image of FIG. 7B shows that each of a void, which is a general defect, a silver streak, and a short shot is generated in the region surrounded by a broken line, as a determination result.

Figure 8:
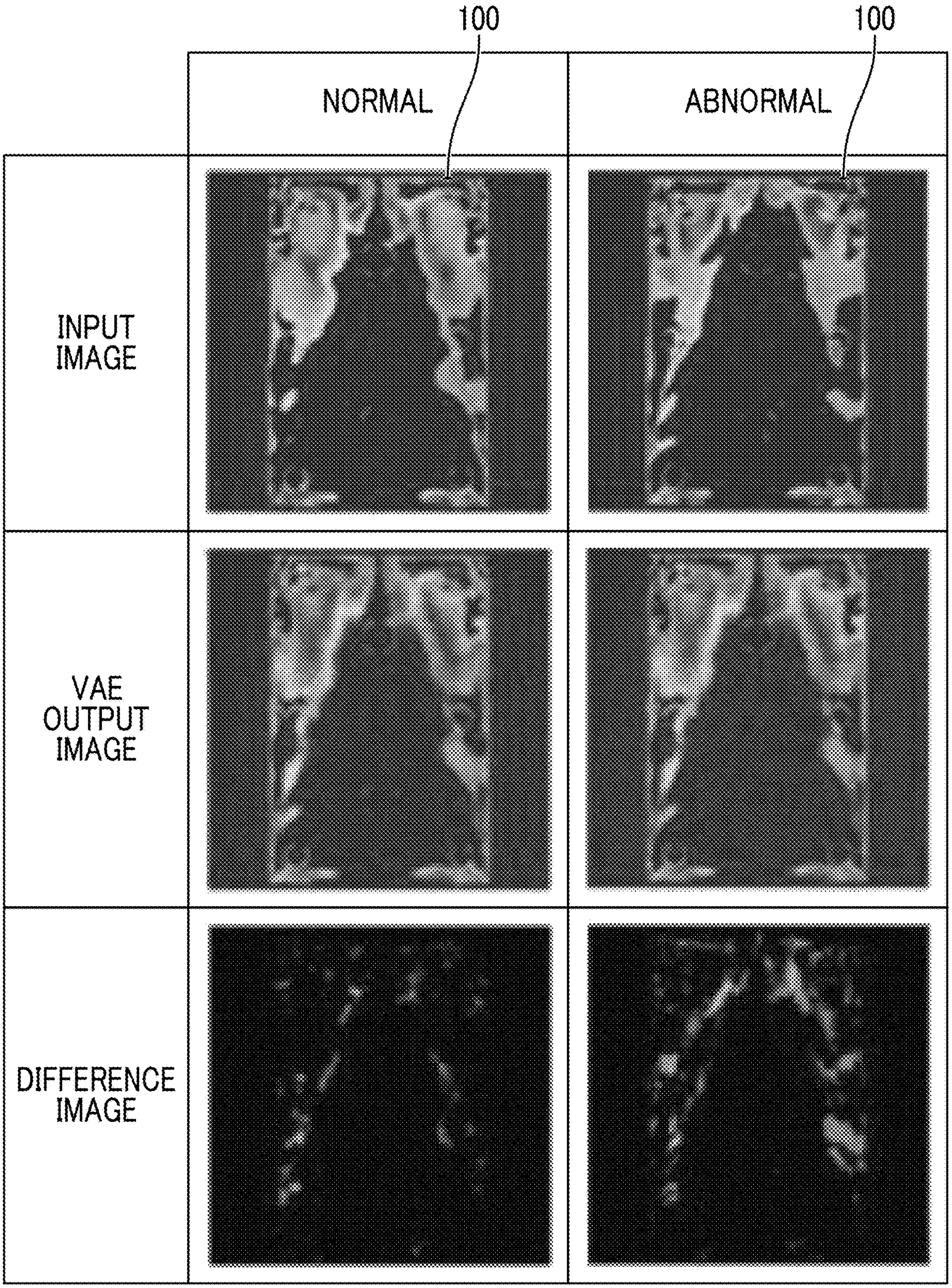
FIG. 8 is a table showing a specific example of a method of determining presence or absence of a defect using a 3ch image.

FIG. 8 is a table showing a specific example of a method of determining the presence or absence of a defect using a 3ch image. The 3ch images shown in FIG. 8 are specific examples of the determination image generated based on the first captured image.

For example, when the presence or absence of a defect is determined by using the 3ch image of the injection molding product 100, the determination device 30 uses a variational autoencoder (VAE) which is one of the generation models generated by deep learning.

Specifically, the determination device 30 uses the VAE to generate a "difference image" representing a difference between an "input image" and a "VAE output image", and determines the presence or absence of a defect from the difference image. The "input image" is a 3ch image generated as a determination image. The "VAE output image" is a 3ch image of the injection molding product 100 having no defect, which is generated as an image approximating the input image, based on the training data stored in the database in advance.

FIG. 8 illustrates the input image, the VAE output image, and the difference image of each of the injection molding product 100 determined to be "normal" (that is, having no defect) and the injection molding product 100 determined to be "abnormal" (that is, having a defect), as the determination result of the determination device 30. In the difference image of the injection molding product 100 determined to be "normal" (that is, having no defect), a portion of a different color indicating the difference is slightly displayed, but in the difference image of the injection molding product 100 determined to be "abnormal" (that is, having a defect), a portion of a different color indicating the difference is largely displayed. That is, when the ratio of the area occupied by the portion of the different color indicating the difference to the entire image is smaller than a predetermined threshold, it is determined to be "normal" (that is, having no defect), and when the ratio is larger than the threshold, it is determined to be "abnormal" (that is, having a defect). The method of the determination by the determination device 30 is not limited to the method using the ratio of the area occupied by the portion of the different color indicating the difference to the entire image, and another method may be used.

In summary, the inspection assistance system 1 according to one embodiment of the present invention may have the following configuration, and can take various embodiments.

That is, the inspection assistance system 1 according to one embodiment includes a first irradiator 12 that irradiates a transparent or translucent injection molding product 100 with light from a lower side, a second irradiator 13 that irradiates the injection molding product 100 with light from an upper side, and an imaging unit 11 that performs first imaging for imaging the injection molding product 100 in a state where the injection molding product 100 is irradiated with the light from the first irradiator 12 and second imaging for imaging the injection molding product 100 in a state where the injection molding product 100 is irradiated with the light from the second irradiator 13, by using a polarization camera.

In this manner, the imaging unit 11 that images the transparent or translucent injection molding product 100 with a polarization camera performs first imaging on the injection molding product 100 on which light is irradiated from the lower side and second imaging on the injection molding product on which light is irradiated from the upper side. Accordingly, all types of defects generated in a transparent or translucent injection molding product can be accurately determined, based on the polarization images in the four directions which are the captured images acquired by each of the first imaging and the second imaging.

Here, a light shielding member 18 serving as the light shielding switching unit that transmits the light from the lower side when the first imaging is performed and that shields the light from the lower side when the second imaging is performed may be further provided.

Accordingly, when the first imaging is performed, the light shielding member 18 transmits the light from the lower side, and when the second imaging is performed, the light shielding member 18 shields the light from the lower side. As a result, when the second imaging is performed, the background of the injection molding product 100 which is a subject can be made dark, thereby improving the quality of the captured image.

In addition, an acquisition unit 301 that acquires a first captured image via the first imaging and a second captured image via the second imaging, and a determination device 30 serving as the presentation unit that analyzes at least one of the acquired first captured image and second captured image and that presents to the user the presence or absence of a defect in the injection molding product 100 may be further provided.

In this manner, the first captured image from the first imaging and the second captured image from the second imaging are analyzed, and the presence or absence of the defect in the injection molding product 100 is presented to the user. As a result, the accuracy of the determination can be improved compared to a case where the user determines whether or not there is a defect while looking at the first captured image or the second captured image with his or her own eyes.

In addition, the determination device 30 may analyze the first captured image and present to the user the presence or absence of the defect derived from the resin flow in the injection molding product 100.

Accordingly, the presence or absence of the defect derived from the resin flow is presented to the user by analyzing the first captured image. As a result, the accuracy of the determination of the presence or absence of the defect can be improved compared to a case where the user determines whether or not there is the defect with his or her own eyes.

In addition, the determination device 30 may analyze the second captured image and present to the user the presence or absence of a defect other than the defect derived from the resin flow in the injection molding product 100.

Accordingly, the presence or absence of a defect other than the defect derived from the resin flow is presented to the user by analyzing the second captured image. As a result, the accuracy of the determination of the presence or absence of the defect can be improved compared to a case where the user determines whether or not there is the defect with his or her own eyes.

Another Embodiment

Configuration of Inspection Assistance System 2

Figure 9:
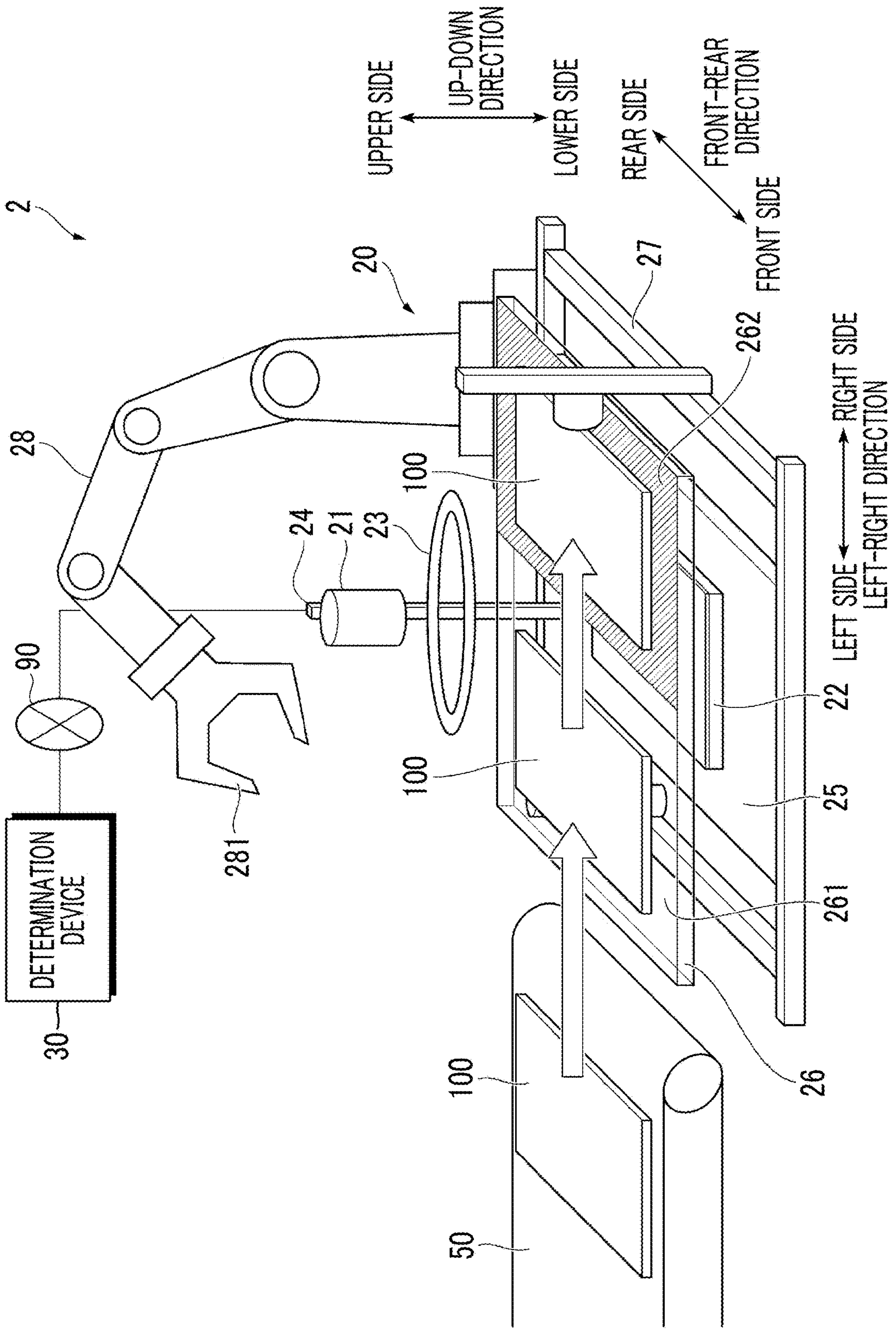
FIG. 9 is a diagram showing an example of an overall configuration of an inspection assistance system according to another embodiment.

FIG. 9 is a diagram showing an example of an overall configuration of an inspection assistance system 2 according to another embodiment.

The inspection assistance system 2 shown in FIG. 9 is used for quality inspection of a transparent or translucent injection molding product 100, as in the inspection assistance system 1 according to one embodiment shown in FIG. 1 described above. The inspection assistance system 2 includes an imaging device 20 and a determination device 30. The configuration of the determination device 30 is the same as the configuration of the determination device 30 of the inspection assistance system 1 according to one embodiment shown in FIG. 1 described above, and thus the description thereof will be omitted.

Imaging Device

The imaging device 20 includes an imaging unit 21, a first irradiator 22, a second irradiator 23, a first fixing member 24, a second fixing member 25, a support member 26, an XY stage 27, and a picking robot 28. Among these, the imaging unit 21, the first irradiator 22, the second irradiator 23, the first fixing member 24, and the second fixing member 25 are the same as the imaging unit 11, the first irradiator 12, the second irradiator 13, the first fixing member 14, and the second fixing member 15 of the imaging device 20 according to one embodiment described above, and thus the description thereof will be omitted.

The support member 26 is a rectangular plate material on which the injection molding product 100 can be placed, and supports the injection molding product 100 from the lower side. The support member 26 is made of, for example, a transparent or substantially transparent plate material having non-polarizing characteristics, such as quartz glass. The support member 26 is supported by the XY stage 27 that allows movement in each of a left-right direction and a front-rear direction in FIG. 9. Therefore, the support member 26 allows movement in each of the left-right direction and the front-rear direction.

The support member 26 includes a light transmission portion 261 that is a region through which light from the lower side is transmitted, and a light shielding portion 262 that is a region for shielding light from the lower side. The light shielding portion 262 is a region formed by attaching a dark member having a light shielding function, such as vinyl chloride or a flocked paper, to the support member 26. The light shielding portion 262 shields the light from the lower side to assist the second imaging by the imaging unit 21. Since the support member 26 is supported by the XY stage 27 as described above, when the first imaging is performed, the injection molding product 100 placed on the light transmission portion 261 is movable in each of the left-right direction and the front-rear direction to be disposed immediately below the second irradiator 23, and when the second imaging is performed, the injection molding product 100 placed on the light shielding portion 262 is movable in each of the left-right direction and the front-rear direction to be disposed immediately below the second irradiator 23.

The picking robot 28 is a robot that grips and moves the injection molding product 100. An end effector 281 capable of gripping the injection molding product 100 may be mounted on the picking robot 28. The picking robot 28 grips and releases the injection molding product 100 via the end effector 281. Accordingly, the picking robot 28 as the light shielding switching unit moves between the light transmission portion 261 and the light shielding portion 262 of the support member 26. Specifically, when the first imaging is performed by the imaging unit 21, the picking robot 28 places the injection molding product 100 on the light transmission portion 261 of the support member 26, and when the second imaging is performed, the picking robot 28 places the injection molding product 100 on the light shielding portion 262 of the support member 26.

In addition, the picking robot 28 moves the injection molding product 100 placed on a belt conveyor 50 to the support member 26. Here, an injection molding machine (not shown) is installed upstream of the belt conveyor 50, and the imaging device 10 is installed downstream of the belt conveyor 50. Therefore, the injection molding product 100 manufactured by the injection molding machine is transported downstream in a state of being placed on the belt conveyor 50, and is gripped by the picking robot 28 to be placed on the light transmission portion 261 of the support member 26 of the imaging device 10. Then, after the first imaging is performed by the imaging unit 21, the injection molding product 100 is placed on the light shielding portion 262 by the picking robot 28, and the second imaging is performed by the imaging unit 21.

In summary, the inspection assistance system 2 according to another embodiment of the present invention may have the following configuration, and can take various embodiments.

That is, the inspection assistance system 2 according to another embodiment includes a first irradiator 22 that irradiates a transparent or translucent injection molding product 100 with light from a lower side, a second irradiator 23 that irradiates the injection molding product 100 with light from an upper side, and an imaging unit 21 that performs first imaging for imaging the injection molding product 100 in a state where the injection molding product 100 is irradiated with the light from the first irradiator 22 and second imaging for imaging the injection molding product 100 in a state where the injection molding product 100 is irradiated with the light from the second irradiator 23, by using a polarization camera.

In this manner, the imaging unit 21 that images the transparent or translucent injection molding product 100 with a polarization camera performs first imaging on the injection molding product 100 on which light is irradiated from the lower side and second imaging on the injection molding product on which light is irradiated from the upper side. Accordingly, all types of defects generated in a transparent or translucent injection molding product can be accurately determined, based on the polarization images in the four directions which are the captured images acquired by each of the first imaging and the second imaging.

Here, a support member 26 including a light transmission portion 261 that transmits the light from the lower side and a light shielding portion 262 that shields the light from the lower side, and on which the injection molding product 100 can be placed on the upper side may further be provided, in which the picking robot 28 serving as the light shielding switching unit may place the injection molding product 100 on the light transmission portion 261 of the support member 26 when the first imaging is performed, and may place the injection molding product 100 on the light shielding portion 262 of the support member 26 when the second imaging is performed.

In this manner, when the first imaging is performed, the injection molding product 100 is placed on the light transmission portion 261 of the support member 26, and when the second imaging is performed, the injection molding product 100 is placed on the light shielding portion 262 of the support member 26. As a result, it is possible to improve the quality of the captured image of the second imaging, and it is possible to smoothly perform switching between the first imaging and the second imaging.

In addition, as the light shielding switching unit, the picking robot 28 or an extruder (not shown) may move the injection molding product 100 between the light transmission portion 261 and the light shielding portion 262.

Accordingly, the movement of the injection molding product 100 between the light transmission portion 261 and the light shielding portion 262 is performed by the picking robot 28 or an extruder (not shown). As a result, the switching between the first imaging and the second imaging can be smoothly performed.

In addition, the second irradiator 23 may be mounted on the end effector 281 of the picking robot 28 serving as the light shielding switching unit.

Accordingly, the second irradiator 23 is mounted on the end effector 281 of the picking robot 28 that moves the injection molding product 100 between the light transmission portion 261 and the light shielding portion 262. As a result, the picking robot 28 integrally performs the work of irradiating the light of the second irradiator 23 and the work of switching between the light transmission and the light shielding. As a result, the second irradiator 23 does not limit the operation range of the end effector 281, so that the degree of freedom of the operation of the end effector 281 can be increased. In addition, since light is irradiated at a close distance from the second irradiator 23, the light can be efficiently irradiated, and power costs can be reduced.

MODIFICATION EXAMPLE

Each of the support member 16 that configures the imaging device 10 according to one embodiment described above and the support member 26 that configures the imaging device 20 according to another embodiment described above is a rectangular plate material, but the shape of the support member is not particularly limited. For example, the shape may be a circle, an ellipse, a triangle, or the like, or may be a shape other than the above.

Figure 10:
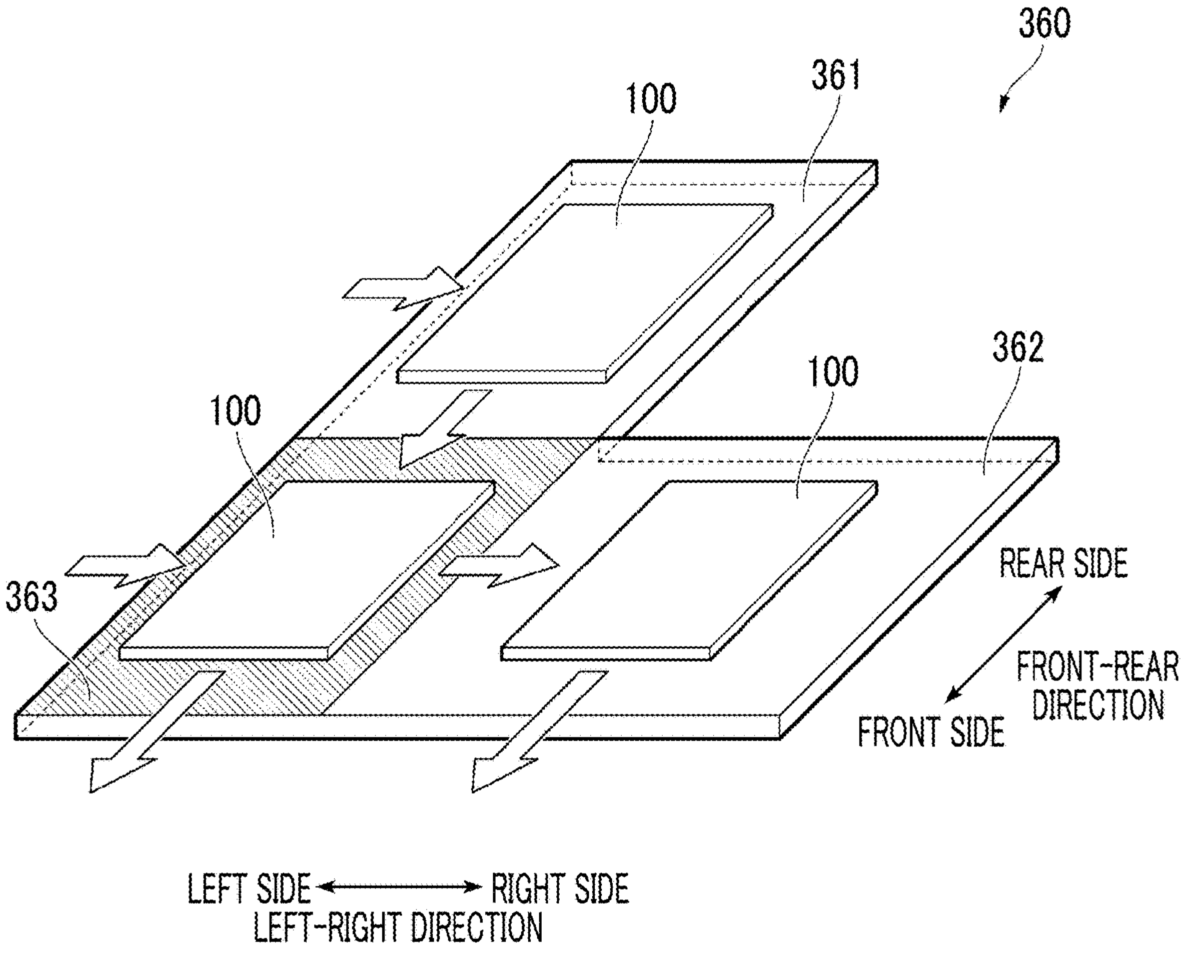
FIG. 10 is a diagram showing another specific example of a shape of a support member.

FIG. 10 is a diagram showing another specific example of a shape of a support member.

A support member 360 illustrated in FIG. 10 is a support member having a shape of a letter "L" as a whole. The support member 360 is made of, for example, a transparent or substantially transparent plate material having non-polarizing characteristics, such as quartz glass, as in the above-described embodiment. The support member 360 is supported by an XY stage (not shown) that allows movement in each of the left-right direction and the front-rear direction in FIG. 10. Therefore, the support member 360 allows movement in each of the left-right direction and the front-rear direction.

The support member 360 includes light transmission portions 361 and 362 which are regions through which light from the lower side is transmitted, and a light shielding portion 363 which is a region for shielding light from the lower side. Since two light transmission portions are provided (light transmission portions 361 and 362), three injection molding products 100 can be imaged simultaneously. This enables efficient inspection. The light shielding portion 363 is a region formed by attaching a dark member having a light shielding function, such as vinyl chloride or a flocked paper, to the support member 360. The light shielding portion 363 shields the light from the lower side to assist the second imaging by the imaging unit (not shown).

In addition, the inspection assistance systems 1 and 2 according to the above-described embodiments both inspect a transparent or translucent resin injection molding product as an inspection target, but the inspection target is not limited to the resin injection molding product. Any product that is transparent or translucent can be inspected.

In addition, the inspection assistance systems 1 and 2 according to the above-described embodiments use a flat plate-shaped lighting fixture as the first irradiator. However, the first irradiator is not limited to the flat plate-shaped lighting fixture. A lighting fixture including any shape capable of irradiating the injection molding product 100 with light from the lower side can be adopted as the first irradiator.

In addition, the inspection assistance systems 1 and 2 according to the above-described embodiments use the ring-shaped lighting fixture as the second irradiator. However, the second irradiator is not limited to the ring-shaped lighting fixture. A lighting fixture including any shape that can irradiate the injection molding product 100 with light from the upper side and that can secure an imaging space for preventing the second irradiator from being reflected as much as possible during imaging can be adopted as the second irradiator. For example, a plurality of lighting fixtures may be disposed to surround the injection molding product 100. However, in this case, the overall power costs may increase compared to the case where a single ring-shaped lighting fixture is disposed.

In addition, the inspection assistance systems 1 and 2 according to the above-described embodiments use a rod-shaped member as the first fixing member, but the first fixing member is not limited to the rod-shaped member. A member having any shape that can fix the imaging unit and the second irradiator can be adopted as the first fixing member.

In addition, the inspection assistance systems 1 and 2 according to the above-described embodiments use a flat plate-shaped member as the second fixing member, but the second fixing member is not limited to the flat plate-shaped member. A member having any shape that can fix the first irradiator and the first fixing member can be adopted as the second fixing member.

In addition, the inspection assistance systems 1 and 2 according to the above-described embodiments use a rectangular plate material as the support member, but the support member is not limited to the rectangular plate material. Any member of any shape on which the injection molding product 100 can be placed can be adopted as the support member.

It should be understood that the invention is not limited to the above-described embodiment, but may be modified into various forms on the basis of the spirit of the invention. Additionally, the modifications are included in the scope of the invention.

What is claimed is:

1. An inspection assistance system comprising:

a first irradiator that irradiates a transparent or translucent injection molding product with light from a lower side;

a second irradiator that irradiates the injection molding product with light from an upper side;

an imaging unit that performs first imaging for imaging the injection molding product in a state where the injection molding product is irradiated with the light from the first irradiator and second imaging for imaging the injection molding product in a state where the injection molding product is irradiated with the light from the second irradiator, by using a polarization camera; and a support member including a light transmission portion that transmits the light from the lower side and a light shielding portion that shields the light from the lower side, the injection molding product being placeable on an upper side of the support member, wherein the injection molding product is placed on the light transmission portion when the first imaging is performed, and is placed on the light shielding portion when the second imaging is performed.

2. The inspection assistance system according to claim 1, wherein the imaging unit does not perform the second imaging when the first imaging is performed, and does not perform the first imaging when the second imaging is performed.

3. The inspection assistance system according to claim 1, wherein directions of polarizers incorporated in the polarization camera are four directions of 0°, 45°, 90°, and 135°.

4. The inspection assistance system according to claim 3, wherein a polarization image in each of the four directions is acquired as a first captured image each time the first imaging is performed once by the polarization camera, and a polarization image in each of the four directions is acquired as a second captured image each time the second imaging is performed once by the polarization camera.

5. The inspection assistance system according to claim 1, further comprising:

a picking robot configured to move the injection molding product between the light transmission portion and the light shielding portion.

6. The inspection assistance system according to claim 5, wherein the second irradiator is mounted on an end effector of the picking robot.

7. The inspection assistance system according to claim 1, further comprising:

a determination device including a processor configured to:

acquire a first captured image obtained by the first imaging and a second captured image obtained by the second imaging;

analyze at least one of the acquired first captured image and the acquired second captured image; and present to a user presence or absence of a defect in the injection molding product.

8. The inspection assistance system according to claim 7, wherein the processor is configured to analyze the first captured image and present to the user presence or absence of a defect derived from a resin flow in the injection molding product.

9. The inspection assistance system according to claim 7, wherein the processor is configured to analyze the second captured image and present to the user presence or absence of a defect other than a defect derived from a resin flow in the injection molding product.

10. An inspection assistance method comprising:

a step of irradiating a transparent or translucent injection molding product with light from a lower side;

a step of irradiating the injection molding product with light from an upper side;

a step of performing first imaging for imaging the injection molding product in a state where the injection molding product is irradiated with the light from the lower side and second imaging for imaging the injection molding product in a state where the injection molding product is irradiated with the light from the upper side, by using a polarization camera;

a step of acquiring a first captured image obtained by the first imaging and a second captured image obtained by the second imaging; and a step of analyzing at least one of the first captured image and the second captured image to present to a user presence or absence of a defect in the injection molding product, wherein the first imaging is performed in a state in which the injection molding product is placed on a light transmission portion, which transmits the light from the lower side, of a support member, and the second imaging is performed in a state in which the injection molding product is placed on a light shielding portion, which shields the light from the lower side, of the support member.

11. A non-transitory computer readable medium storing a program, the program when executed by a computer, causing the computer to:

irradiate a transparent or translucent injection molding product with light from a lower side;

irradiate the injection molding product with light from an upper side;

perform first imaging for imaging the injection molding product in a state where the injection molding product is irradiated with the light from the lower side and second imaging for imaging the injection molding product in a state where the injection molding product is irradiated with the light from the upper side, by using a polarization camera;

acquire a first captured image obtained by the first imaging and a second captured image obtained by the second imaging; and analyze at least one of the first captured image and the second captured image to present to a user presence or absence of a defect in the injection molding product, wherein the first imaging is performed in a state in which the injection molding product is placed on a light transmission portion, which transmits the light from the lower side, of a support member, and the second imaging is performed in a state in which the injection molding product is placed on a light shielding portion, which shields the light from the lower side, of the support member.

* * * * *